US006998754B2

(12) United States Patent
Nedriga et al.

(10) Patent No.: US 6,998,754 B2
(45) Date of Patent: Feb. 14, 2006

(54) BRUSH ASSEMBLIES

(75) Inventors: Michael Walter Nedriga, Garner, NC (US); Pimol Ballard Vonkchalee, Apex, NC (US); Shepard Lynn Hockaday, Benson, NC (US); Alvin Leon Farthing, Roseboro, NC (US); Otway Archer Southall, Farmville, VA (US)

(73) Assignee: Energy Conversion Systems Holdings, LLC, Dunn, NC (US)

( * ) Notice: Subject to any disclaimer, the term of this patent is extended or adjusted under 35 U.S.C. 154(b) by 0 days.

(21) Appl. No.: 10/793,706

(22) Filed: Mar. 5, 2004

(65) Prior Publication Data

US 2005/0194861 A1 Sep. 8, 2005

(51) Int. Cl.
*H01R 39/38* (2006.01)

(52) U.S. Cl. .................... 310/242; 310/239; 310/42
(58) Field of Classification Search ........ 310/238–247, 310/42
See application file for complete search history.

(56) References Cited

U.S. PATENT DOCUMENTS

| 3,267,312 | A | * | 8/1966 | Redick et al. .............. 310/239 |
|---|---|---|---|---|
| 3,739,205 | A | * | 6/1973 | Winkelmann ................ 310/42 |
| 4,423,549 | A | * | 1/1984 | King ........................... 29/597 |
| 4,593,220 | A | * | 6/1986 | Cousins et al. ............. 310/239 |
| 4,694,214 | A | * | 9/1987 | Stewart, Sr. ................ 310/239 |
| 5,006,747 | A | * | 4/1991 | Stewart, Sr. ................ 310/239 |
| 5,089,735 | A | * | 2/1992 | Sawaguchi et al. ........... 310/88 |
| 5,124,602 | A | * | 6/1992 | Nishimura et al. ....... 310/68 B |
| 5,495,134 | A | * | 2/1996 | Rosenblum ................. 310/239 |
| 5,977,683 | A | * | 11/1999 | Scheele et al. ............ 310/242 |
| 5,990,594 | A |   | 11/1999 | Hyatt, Jr. et al. .......... 310/249 |
| 6,031,313 | A | * | 2/2000 | Sugai et al. ................ 310/239 |
| 6,356,004 | B1 |   | 3/2002 | Porter et al. ............... 310/239 |
| 6,664,698 | B1 |   | 12/2003 | Tasch et al. ................ 310/239 |
| 6,664,701 | B1 |   | 12/2003 | Ortt et al. .................... 310/239 |

\* cited by examiner

Primary Examiner—Dang Le
(74) Attorney, Agent, or Firm—McCarter & English, LLP

(57) ABSTRACT

Detailed are brush assemblies for electric motors. The assemblies may include retention springs or other mechanisms designed to bias brushes away from surfaces of commutators during assembly of the motors. Such retention mechanisms additionally may be fitted into cavities in associated cover plates following motor assembly. The cover plates further may include tabs which, in use of the motor, assist in supporting side surfaces of the brushes and in orienting the plate relative to a corresponding brush card.

20 Claims, 4 Drawing Sheets

BRUSH ASSEMBLIES

FIELD OF THE INVENTION

This invention relates to brush assemblies for electric motors and more particularly, although not necessarily exclusively, to such assemblies incorporating components for retaining brushes in selected positions during assembly of electric motors.

BACKGROUND OF THE INVENTION

Disclosed in U.S. Pat. No. 6,664,701 to Ortt, et al., whose contents are incorporated herein in their entirety by this reference, is an example of a brush assembly for an electric motor. FIG. 2 of the Ortt patent illustrates the assembly, which includes a brush, an electrical connector for the brush, and a spring. As noted in the Ortt patent, the spring functions to bias the brush into contact with an outer surface of a commutator and thereby "complete the electrical circuit between the rotating commutator and a power source." See Ortt, col. 1, 11.26–27.

U.S. Pat. No. 5,990,594 to Hyatt, Jr., et al., whose contents, by this reference, are also incorporated herein in their entirety, details another brush assembly for use as part of an electric motor. In this assembly, coil springs are positioned within brush sleeves so as to bias brushes into contact with a commutator. Consistent with many conventional brush assemblies, however, neither the assembly of the Ortt patent nor that of the Hyatt, Jr. patent utilizes springs or other resilient materials to bias brushes away from any commutator surface during motor assembly or otherwise.

SUMMARY OF THE INVENTION

The present invention provides alternative brush assemblies for electric motors. Included among components of the assemblies are springs, or other mechanisms, designed to bias brushes away from surfaces of a commutator during assembly of a motor. Also included in each assembly may be a cover plate with a cavity into which a retention spring may be fitted following formation of the motor. If present, the plate additionally may (if desired) incorporate one or more tabs which, in use of the motor, assist in supporting side surfaces of the brushes and in orienting the plate relative to a corresponding brush card.

Prior to operation of the assembled electric motor, the retention spring operates to counteract—and either balance or overcome—forces provided by coil or other springs used to bias brushes toward commutator surfaces. Consequently, before operation of the motor the brushes are not biased toward a commutator surface. This lack of bias greatly facilitates assembly of the motor, as it allows insertion of the commutator into the card carrying the brushes without undesired contact between the commutator and brushes. By contrast, in many conventional assemblies, a separate plastic tube is used temporarily to restrain the brushes so that the commutator may be positioned appropriately relevant to the card. The present invention thus also avoids the need for a separate tube to be used for this purpose.

Further, although the retention spring of the invention is not needed after a motor is assembled, it need not be removed from the assembly. Instead, the retention spring may be fitted into a cavity in the associated cover plate and retained there throughout the life of the motor. Indeed, in preferred embodiments, the act of inserting the brush card itself onto the motor causes a commutator to move the retention spring into the cavity, so that no further effort is required to fit the spring there. Hence, no separate operation to remove the retention spring is necessary.

One proposed embodiment of the retention spring is generally circular, but with a flattened (straightened) end segment and flanges protruding from an open opposite end. The flattened end, which abuts a corresponding surface of the brush card, helps orient the spring relative to the card so that the flanges are aligned with (nominally) vertical channels in the opposite end of the card. When the retention spring is subjected to vertical forces, the flanges may travel within the channels while the flattened end slides along its abutting surface. Should its flanges exit the channels, the retention spring will expand and be captured by the cavity in the cover plate. However, absent the existence of such vertical forces acting on the retention spring, movement of the retention spring will be constrained relative to the brush card, with its curved surfaces restraining movement of the brushes within the card.

To facilitate placement of brushes within cards and provide electrical access to the brushes, many brush cards omit much of one side wall of each brush housing. A consequence of this omission is lack of complete support for the brushes within the housings, particularly on the side where parts of the walls are omitted. Hence, included in some embodiments of the cover plate are one or more tabs protruding toward the brush card. Such tabs, if present, may function as partial walls for the brush housings within the card, further supporting respective side surfaces of the brushes. As noted above they also may orient the cover plate relative to the brush card.

It thus is an optional, non-exclusive object of the present invention to provide brush assemblies in which brushes are constrained within an associated card prior to assembly of an electric motor.

It also is an optional, non-exclusive object of the present invention to provide brush assemblies in which the brush-constraint mechanism need not be removed to complete assembly of the electric motor.

It is another optional, non-exclusive object of the present invention to provide retention mechanisms for brushes that may be fitted into brush cards.

It is, moreover, an optional, non-exclusive object of the present invention to provide retention mechanisms in the form of springs having flanges fitted into the brush cards.

It is a further optional, non-exclusive object of the present invention to provide brush assemblies with cover plates having cavities (recesses) into which retention mechanisms may be fitted following assembly of the electric motors.

It is yet another optional, non-exclusive object of the present invention to provide cover plates having one or more tabs protruding therefrom, which tabs form portions of walls for brush housings of the brush cards.

Other objects, features, and advantages of the present invention will be apparent to those skilled in the relevant fields with reference to the remaining text and drawings of this application.

DETAILED DESCRIPTION

Figure 1:
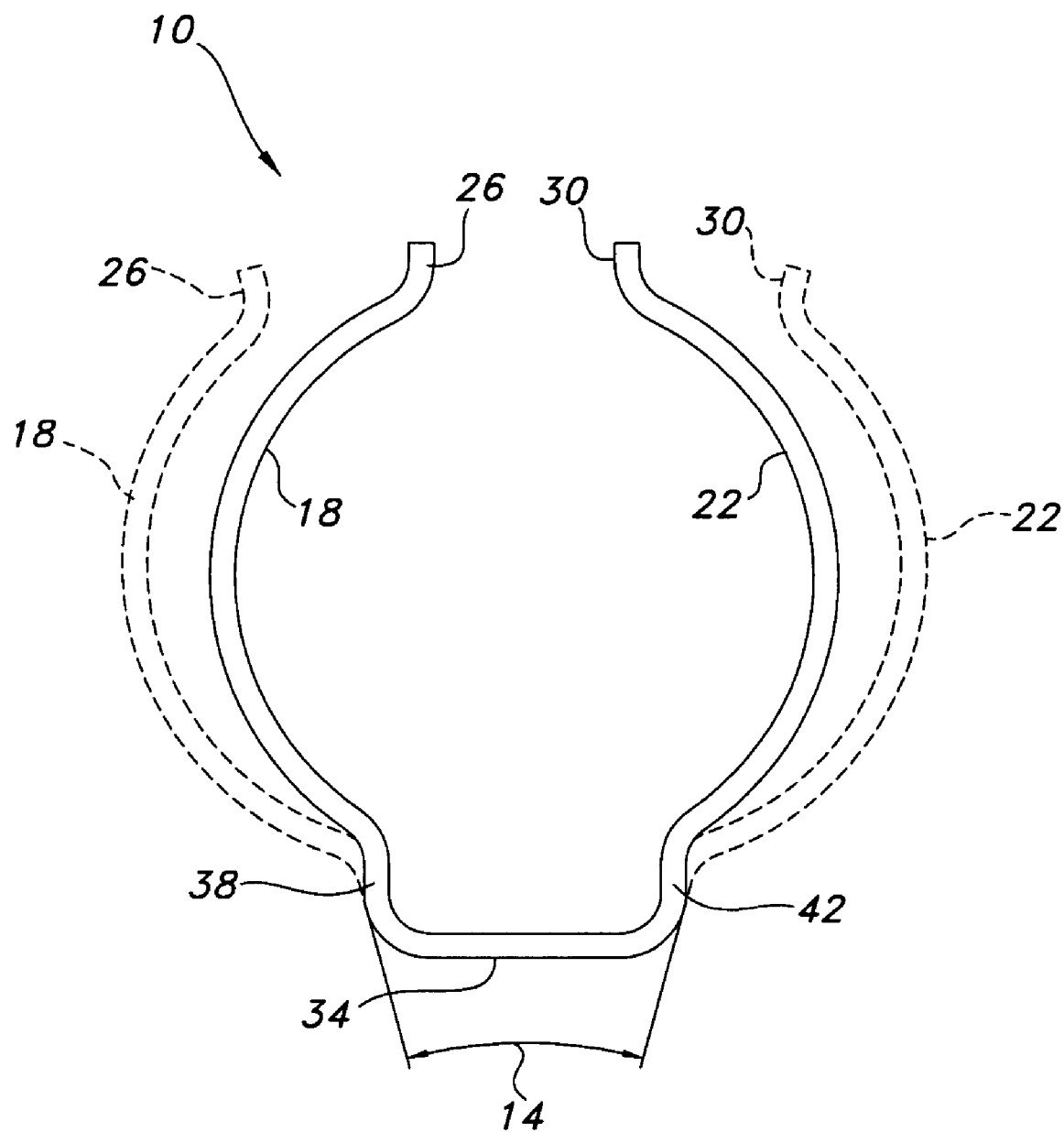
FIG. 1 illustrates, in plan view, an exemplary retention mechanism of the present invention.

Depicted in FIG. 1 is retention mechanism 10 of the present invention. Mechanism 10 is preferably (although not necessarily) in the form of a spring with end section 14, opposed resilient legs 18 and 22, and flanges 26 and 30. FIG. 1 illustrates mechanism 10 in two positions, with legs 18 and 22 "closed" (in solid lines) and "open" (in dotted lines).

Versions of mechanism 10 consistent with FIG. 1 appear generally circular or U-shaped, with an open area opposite end section 14. End section 14 may include a flat or straight segment 34 and transitional segments 38 and 42 connecting flat segment 34 to respective legs 18 and 22. Segment 34 is designed to abut a corresponding surface of an associated brush card. Those skilled in the relevant art will, however, recognize that segment 34 need not necessarily be flat, but rather may be shaped differently depending on the shape of the corresponding surface of the card (or otherwise as appropriate or desired).

Legs 18 and 22 beneficially are curved so that, when in the closed position, their curvature generally matches the internal curvature of the associated brush card. In the embodiment of FIG. 1, legs 18 and 22 terminate at respective flanges 26 and 30 at the open end of mechanism 10, with such flanges 26 and 30 designed to fit into corresponding channels of the brush card so as to compress legs 18 and 22. Again, however, those skilled in the relevant fields will understand that legs 18 and 22 need not necessarily terminate in flanges 26 and 30 and that other methods of engaging the brush card may be utilized instead. Because mechanism 10 is wider in its "open" state, clear from FIG. 1 is that it thus will exert outward force radially when legs 18 and 22 are compressed radially into the "closed" state. This outward radial force exerted by legs 18 and 22 functions to counteract opposite spring forces acting on the brushes within a card, thus retaining the brushes in a desired position during assembly of the electric motor.

Figure 2:
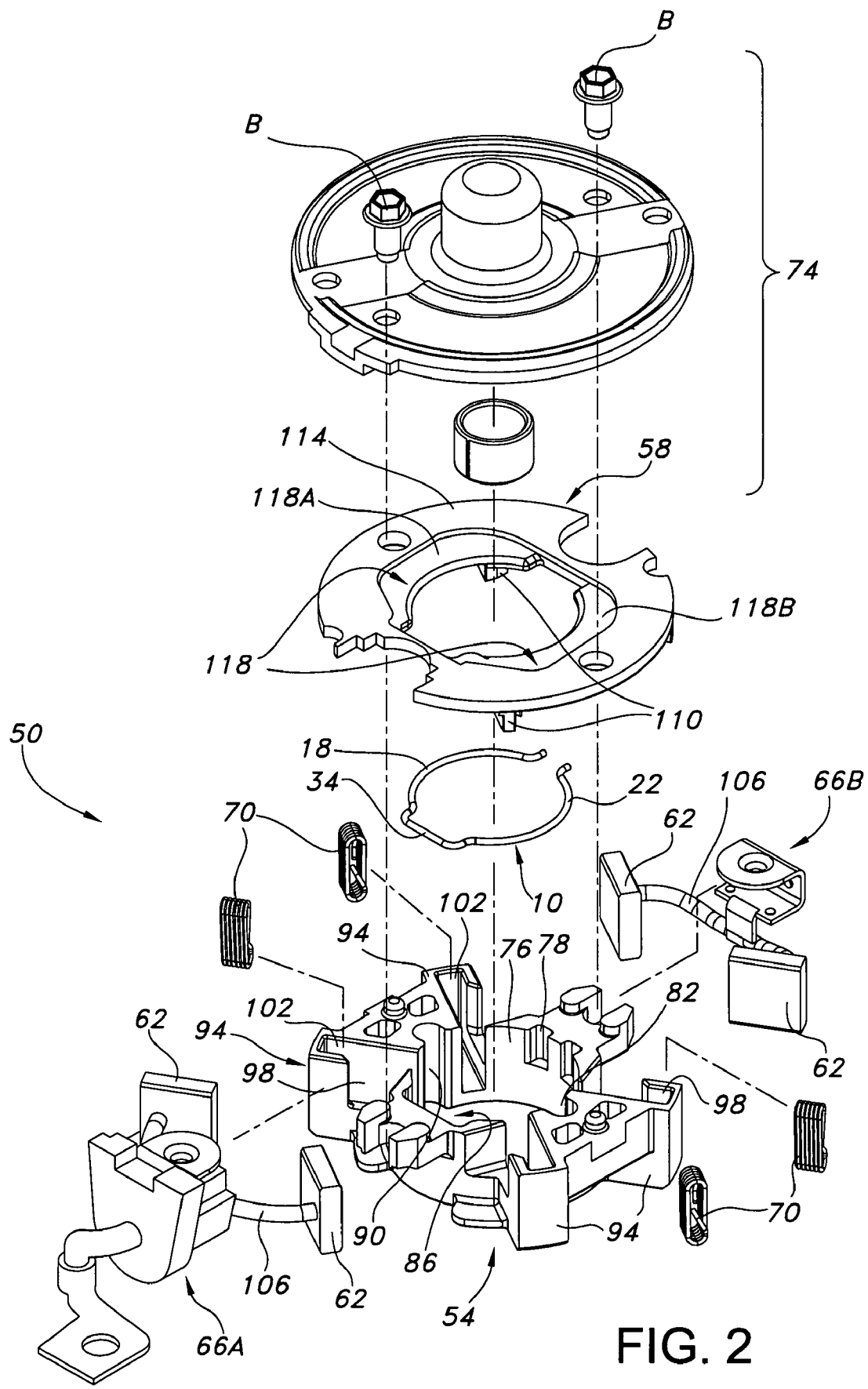
FIG. 2 presents an exploded view of a brush assembly of the present invention including the retention mechanism of FIG. 1.

Illustrated in FIG. 2 are components of a brush assembly 50 of the present invention. Assembly 50 incorporates retention mechanism 10 as well as at least brush card 54, plate 58, and one or more brushes 62. Also shown in FIG. 2 are subassemblies 66A and 66B to which brushes 62 are connected, springs 70 (one associated with each brush 62), and end cap assembly 74. Although four brushes 62 and springs 70 are illustrated in FIG. 2, more or fewer brushes and springs may be included instead.

FIG. 2 also details novel aspects of brush card 54, including its interior surface 76. As shown in FIG. 2, card 54 may contain channels 78 and 82 extending from surface 76 and whose major axes are generally perpendicular to the major plane of card 54. (Stated differently, if card 54 is positioned horizontal to a surface, then channels 78 and 82 will be positioned more or less vertically.) Although channels 78 and 82 need not be oriented as depicted in FIG. 2, this orientation is preferred, as it facilitates desired movement of retention mechanism 10 after a motor is assembled. When retention mechanism 10 is in use, legs 18 and 22 are compressed and fitted into, respectively, channels 78 and 82 so that mechanism 10 is in the "closed" state.

Included as well in brush card 54 are recess 86, whose surface 90 abuts (or otherwise engages) segment 34 of mechanism 10, and housings 94, one for each of brushes 62. Depicted in FIG. 2 is that housings 94 are incomplete, in that they do not fully envelop their associated brushes. For example, housings 94 intentionally lack wall structure at interior surface 76 so that brushes 62 may contact a commutator placed in the space bounded by surface 76. Each housing 94 additionally may have an incomplete side wall 98 and an open end 102 to permit a brush 62 to be placed therein and a corresponding electrical lead 106 to extend therefrom.

Plate 58 may be attached to card 54 (using fasteners such as bolts B or other attachment means) so as to cover open ends 102 of housings 94. In this way, brushes 62 may be precluded from escaping housings 94 through ends 102. Further, however, plate 58 may include one or more tabs 110 protruding therefrom, preferably one tab 110 for each side wall 98. If present, such tabs 110 may be positioned so as partially to complete the incomplete side walls 98, thereby enveloping and supporting more of each brush 62. Because tabs 110 would be designed to fit into the incomplete areas of walls 98, they also could facilitate properly orienting plate 58 for attachment to card 54.

Side 114 of plate 58 opposite card 54 beneficially includes cavity 118 (divided into recessed sections 118A and 118B). If retention mechanism 10 is pushed or otherwise forced toward plate 58, compressed legs 18 and 22 will begin travelling within channels 78 and 82 toward plate 58 as well. Once at the open ends of channels 78 and 82, legs 18 and 22 will expand into, respectively, recesses 118A and 118B and thus be "captured" by cavity 118. Cavity 118 hence provides a resting place for retention mechanism 10 after it is no longer needed to restrain brushes 62. End cap 122 of cap assembly 74 may be fitted over plate 58 so as to cover, among other things, recess 118 and thereby prevent retention mechanism 10 from exiting assembly 50.

Figure 3:
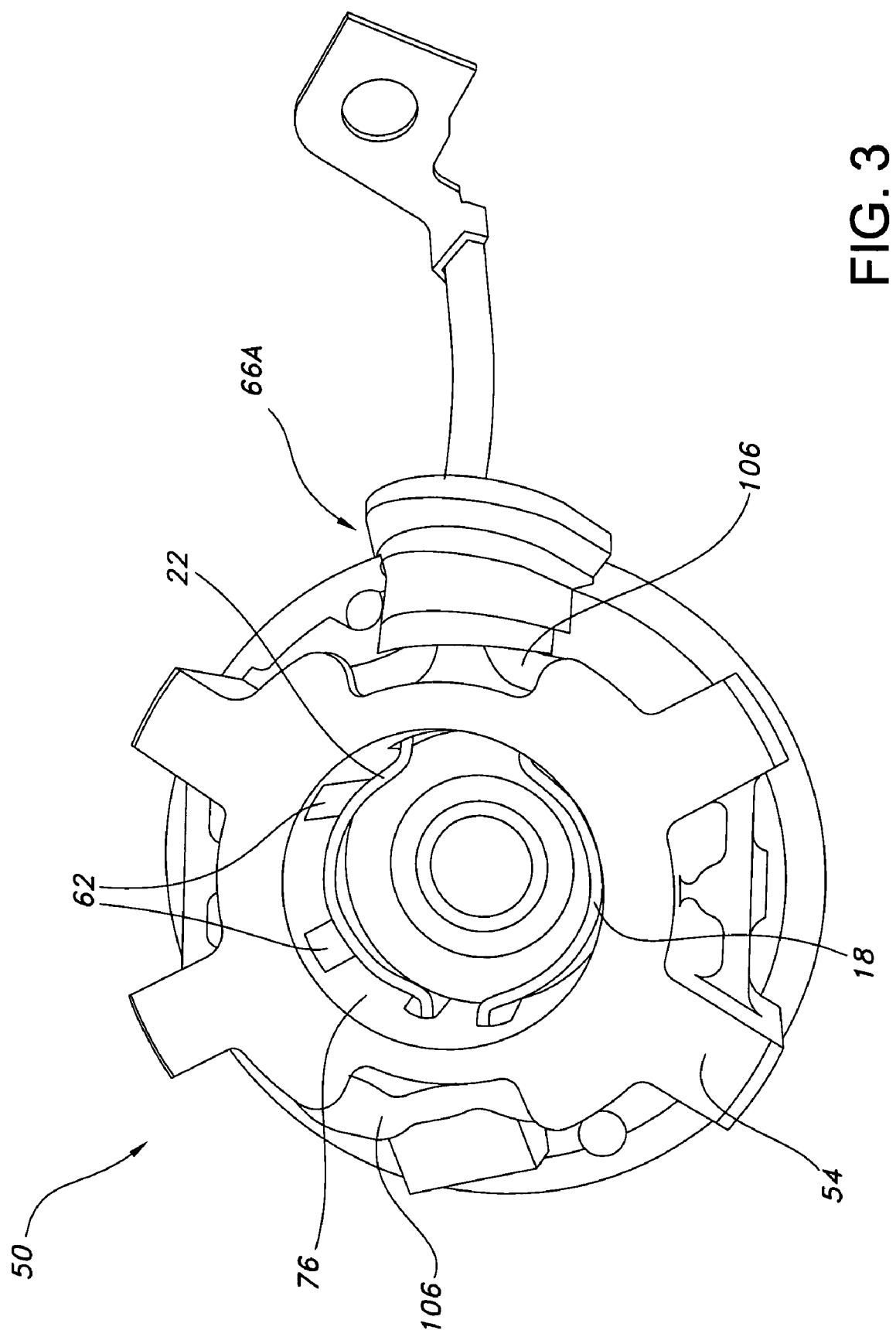
FIG. 3 illustrates the brush assembly of FIG. 2 prior to incorporation into a motor.

FIG. 3 shows mechanism 10 in its operational position, with legs 18 and 22 restraining brushes 62. Because springs 70 bias brushes 62 toward the open area bounded by surface 76, absent intervention brushes 62 would tend to protrude into that open area. Their doing so could, in turn, hinder insertion of a commutator into that area. Retention mechanism 10 provides such intervention, with the outward radial force exerted by legs 18 and 22 overcoming (or at least balancing) the force of springs 70, thereby preventing brushes 62 from extending substantially out of housings 94 into the open area.

Figure 4:
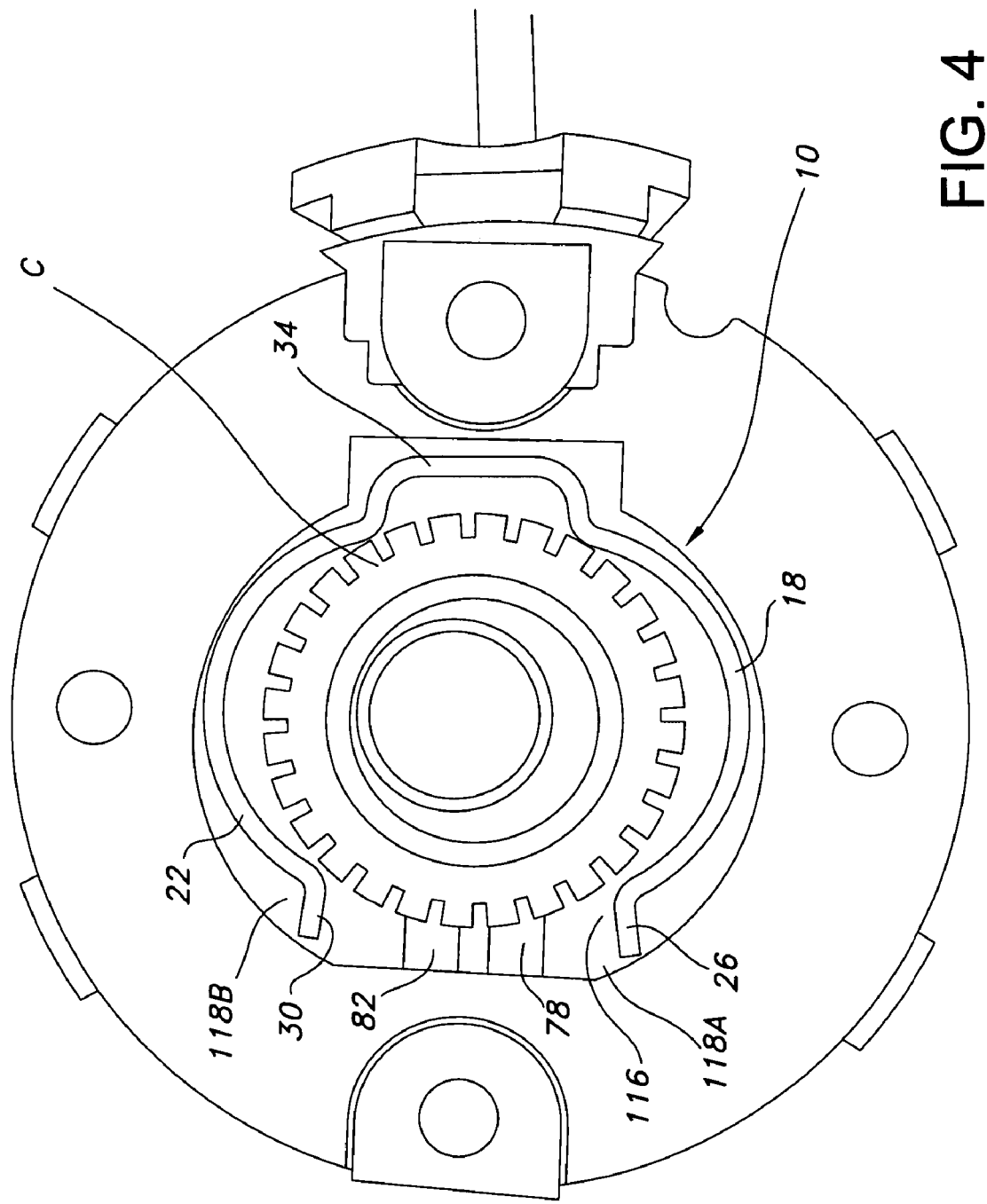
FIG. 4 shows the brush assembly of FIGS. 2–3 following incorporation into a motor.

FIG. 4 illustrates retention mechanism 10 in its resting position within cavity 118 following incorporation of brush assembly 50 into a motor. (For clarity, end cap assembly 74 has been omitted from this drawing.) Visible in FIG. 4 is commutator C of the motor. Upon insertion of brush assembly 10 onto the motor, commutator C engages retention mechanism 10 and pushes it toward plate 58. This in turn causes flanges 26 and 30 to travel within channels 78 and 82 until they exit therefrom into recesses 118A and 118B, at which time legs 18 and 22 extend, precluding flanges 26 and 30 from returning to the channels 78 and 82. Retention mechanism 10 thus need not be removed from brush assembly 50, but thereafter may rest in cavity 118 and not impede proper functioning of the motor.

The foregoing is provided for purposes of illustrating, explaining, and describing exemplary embodiments and certain benefits of the present invention. Modifications and adaptations to the illustrated and described embodiments will be apparent to those skilled in the relevant art and may be made without departing from the scope or spirit of the invention.

What is claimed is:

1. A brush assembly for an electric motor, the brush assembly comprising:

a brush card having an opening configured and dimensioned for receiving a commutator, the opening including a wall and a channel located along the wall, the channel including a channel side wall;

a brush coupled to and supported by the brush card, and positioned to contact, in the event one is received in the opening, a commutator; and a resilient member including a restraining section and a flange, the flange being configured and dimensioned to be received in the channel;

wherein the resilient member is further adapted to assume a deflected position, and is mounted to the brush card at the opening in the deflected position such that the restraining section addresses the brush so as to restrain a movement thereof in at least one direction relative to the brush card, and such that the flange is received in the channel, and engages the channel side wall.

2. A brush assembly for an electric motor according to claim 1, wherein the resilient member is adapted to be compressed so as to assume a closed deflected position, and is mounted to the brush card at the opening in the closed deflected position.

3. A brush assembly for an electric motor according to claim 1, wherein the restraining section is included in a curved portion of a leg of the resilient member shaped to fit within the opening, the flange being located at an end of the leg.

4. A brush assembly for an electric motor according to claim 1, wherein the channel extends along an axial direction of extension of the opening, and the flange is supported along the axial direction by an end surface of the channel.

5. A brush assembly for an electric motor according to claim 1, wherein, when a commutator is received within the opening to a predetermined depth, such commutator moves the resilient element through the opening to an extent sufficient to prevent the restraining section from so addressing the brush, and to push the flange out of the channel, thereby permitting the resilient member to relax relative to the deflected position and thereby assume a rest position.

6. A brush assembly for an electric motor according to claim 5, wherein, when the flange is pushed out of the channel, the resilient element is entirely dislodged from the opening.

7. A brush assembly for an electric motor according to claim 6, further comprising a cover plate coupled to the brush card adjacent the opening, and defining a cavity in the cover plate adapted to receive and retain the resilient member in the rest position upon the resilient member being dislodged from the opening.

8. A brush assembly for an electric motor according to claim 7, wherein the cover plate includes a first side facing the opening of the brush card, and a second side opposite the first side, and wherein the cavity is defined in the second side.

9. A brush assembly for an electric motor according to claim 1, wherein the resilient element is a spring including two legs adapted to flex relative to each other, and the flange is associated with an end of one of the two legs.

10. A brush assembly for an electric motor according to claim 9, wherein the spring includes a substantially linearly straight section disposed opposite the flange, and the restraining section is a section of the leg, with an end of which the flange is associated.

11. A brush assembly for an electric motor according to claim 1, further comprising a biasing spring positioned at least partly within the brush card and in operative contact with the brush for biasing the brush inward relative to the opening.

12. A brush assembly for an electric motor according to claim 11, wherein the restraining section is arranged in opposition to the bias of the biasing spring.

13. A brush assembly for an electric motor, comprising:

a brush card having an opening configured and dimensioned for receiving a commutator, the opening including a wall and a channel located along the wall, the channel including a channel side wall;

a brush coupled to and supported by the brush card, and positioned adjacent the opening such that the brush is positioned to contact, in the event one is received in the opening, a commutator; and a resilient member including a restraining section and a flange configured and dimensioned to be received in the channel, the resilient member being further adapted to be assume a deflected position, and being received in the opening in the deflected position such that the restraining section is positioned adjacent the brush, thereby restraining the brush from moving inward relative to the opening, and the flange is received in the channel and engages the channel side wall.

14. A brush assembly according to claim 13, wherein the resilient member is adapted to be compressed so as to assume a closed deflected position, and is mounted to the brush card at the opening in the closed deflected position.

15. A brush assembly according to claim 13, wherein the resilient member is further adapted to receive an urging force applied along a first direction from a commutator inserted into the brush card opening along the first direction, and to react to the urging force by moving substantially in translation along the first direction at least until the restraining section is translated out of contact with the brush, and thereby no longer so restrains the brush.

16. A brush assembly for an electric motor according to claim 13, further comprising a biasing spring positioned at least partly within the brush card and in operative contact with the brush for biasing the brush inward relative to the opening.

17. A brush assembly for an electric motor according to claim 16, wherein the restraining section is in opposition to the bias of the biasing spring.

18. A brush assembly for an electric motor, comprising:

a brush card having a opening extending in a first direction and configured and dimensioned for receiving a commutator inserted into the brush card along the first direction, the opening including a wall and a channel extending in the first direction along the wall;

a brush coupled to and supported by the brush card, and positioned adjacent the opening such that the brush extends radially inward relative to the opening, and is positioned to contact, in the event one is received in the opening, a commutator; and a resilient member including a first curved leg, a second curved leg, and a central span disposed between the first and second curved legs and configured and dimensioned to be received in and translate along the channel, and to key the resilient element rotationally relative to the opening;

wherein the resilient member is adapted to be assume a deflected position in which the first and second curved legs are flexed relative to each other about the central span, and the resilient member is received in the opening in the deflected position such that one of the first and second curved legs is positioned in operative contact with the brush, and is permitted to restrain the brush from moving radially inward relative to the opening; and wherein the resilient member is further adapted to receive an urging force applied along the first direction from a commutator inserted into the brush card opening, and to react to the urging force by moving substantially in translation along the first direction at least until the one of the first and second legs is translated out of such operative contact with the brush.

19. A brush assembly for an electric motor in accordance with claim 18, wherein the resilient member is adapted to be compressed so as to assume a closed deflected position in which the first and second curved legs are flexed toward each other about the central span, and the resilient member is received in the opening in the closed deflected position.

20. A brush assembly for an electric motor in accordance with claim 18, wherein the central span has a substantially linearly straight shape.

* * * * *